(12) United States Patent
Dewald et al.

(10) Patent No.: US 7,574,990 B2
(45) Date of Patent: Aug. 18, 2009

(54) GASKET CONTAINING FUEL PERMEATION BARRIER

(75) Inventors: Richard E. Dewald, Clinton, MI (US); Ute Rueger, Ann Arbor, MI (US); Kerry C. Smith, Ann Arbor, MI (US); Timo Walz, Gondelsheim (DE); Bhawani S. Tripathy, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 165 days.

(21) Appl. No.: 11/743,927

(22) Filed: May 3, 2007

(65) Prior Publication Data

US 2008/0272549 A1 Nov. 6, 2008

(51) Int. Cl.
*F02B 75/22* (2006.01)

(52) U.S. Cl. .............................. 123/195 R; 123/195 C; 277/313

(58) Field of Classification Search ............. 123/195 R, 123/195 C
See application file for complete search history.

(56) References Cited

U.S. PATENT DOCUMENTS

| 3,064,983 | A | | 11/1962 | Halterman |
|---|---|---|---|---|
| 3,204,988 | A | | 9/1965 | Ouderkirk et al. |
| 4,142,032 | A | | 2/1979 | D'Angelo |
| 4,404,256 | A | * | 9/1983 | Anand et al. ................ 428/409 |
| 4,720,518 | A | | 1/1988 | Chihara et al. |
| 5,456,327 | A | | 10/1995 | Denton et al. |
| 5,616,403 | A | | 4/1997 | Eckberg et al. |
| 6,273,231 | B1 | | 8/2001 | Koschmieder et al. |
| 6,443,502 | B1 | | 9/2002 | Iida et al. |
| 6,502,682 | B2 | | 1/2003 | Koschmieder et al. |
| 7,144,622 | B1 | | 12/2006 | Stecher et al. |
| 2002/0034589 | A1 | | 3/2002 | Tarney et al. |

FOREIGN PATENT DOCUMENTS

| DE | 40 05 047 | | 8/1991 |
|---|---|---|---|
| DE | 10025601 | A1 | 11/2001 |
| DE | 102004007892 | A1 | 9/2004 |
| EP | 0879611 | A2 | 11/1998 |
| EP | 1566582 | A1 | 8/2005 |
| EP | 1617067 | A | 1/2006 |
| GB | 1090162 | A | 11/1967 |
| GB | 1378485 | A | 12/1974 |
| JP | 61076582 | A * | 4/1986 |
| JP | 2006-29587 | A | 2/2006 |
| JP | 2006-29588 | A | 2/2006 |

* cited by examiner

*Primary Examiner*—Noah Kamen
(74) *Attorney, Agent, or Firm*—Robert L. Stearns; Dickinson Wright PLLC

(57) ABSTRACT

A method for reducing fuel permeation through gasketed joints in an internal combustion engine (10) includes surface treating the gaskets in a halogenated medium before placing them into service. A low-cost elastomer such as acrylic, EPDM or HNBR, can be used for the gasket body. The halogenated medium may comprise either a liquid bath or a gaseous bath, into which the gasket is immersed. The halogenated medium bath is excited by heating to accelerate the halogenation process. A gasket treated according to this invention possesses a chemically altered exterior surface which substantially enhances its fuel permeability resistance at relatively low cost.

8 Claims, 4 Drawing Sheets

GASKET CONTAINING FUEL PERMEATION BARRIER

CROSS REFERENCE TO RELATED APPLICATIONS

NONE.

BACKGROUND OF THE INVENTION

1. Field of the Invention

The subject invention relates generally to a gasket treated to reduce fuel permeation, and more specifically to a polymer gasket that is surface treated with a halogenated solution to substantially enhance the gasket's resistance to fuel permeability.

2. Related Art

In internal combustion engines, highly volatile fuel is used for the combustion process. Ever increasing emission regulations motivate engine and automobile manufacturers to minimize the escape of unburnt fuel to the environment. Typically, unburnt fuel escapes by permeating through static gaskets of the type used throughout an engine to seal various bolt-on components. Gaskets in the fuel delivery path are particularly vulnerable to fuel permissivity, but gaskets on the oil side of engines are also at risk. Because fuel mixes with engine oil up to 20% between oil changes, even an oil pan gasket is vulnerable to fuel permeation.

Gaskets made from plentiful, low-cost acrylic elastomers are typically used in non-fuel path applications. In order to reduce fuel vapor permeation through fuel path gaskets, the prior art has taught to manufacture those gaskets from fluorinated elastomers. Fluorinated elastomer materials, while effective as a fuel permeation barrier, are typically four times more expensive than the same gasket made from an acrylic elastomer. In other words, because of the high cost differential, gaskets made from a homogenous fluorinated elastomer material have been used mainly in intake manifolds and other fuel path applications. Whereas, the more cost effective acrylic, EPDM or HNBR elastomer gaskets tend to be used for valve covers, oil pan gaskets and the like where small amounts of fuel permeation have been considered tolerable.

Because of the heightened concern about the escape of fuel from engines for environmental reasons, there is a need to more completely outfit an internal combustion engine with gaskets resistive to fuel permeation. However, this desire must be offset by the high cost of prior art solutions which manufacture the entire gasket body from fluorinated elastomer.

SUMMARY OF THE INVENTION

The subject invention overcomes the shortcomings and disadvantages found in prior art gasket systems by providing a method for reducing fuel permeation through gasketed joints in an internal combustion engine. The subject method comprises the steps of providing a first engine component, providing a second engine component adapted for direct connection to the first engine component, and providing a gasket of the type to be compressed between opposing surfaces for the purpose of establishing a fluid-tight interface therebetween. The gasket includes an exterior surface containing hydrogen atoms. The method further includes compressing the gasket between the first engine component and the second engine component to create a fluid-tight sealed interface therebetween. The advantages of this invention are achieved by the step of surface treating the gasket in a halogenated medium prior to the compressing step, whereby halogen atoms in the halogenated medium replace hydrogen atoms in the exterior surface of the gasket thereby altering the chemical composition of the exterior surface and substantially enhancing the fuel permeability resistance of the gasket.

Whereas prior art solutions required manufacturing the gasket from a homogenous fluorinated elastomer material, the subject invention treats only the surface of the gasket in a halogenation process. The exterior surface of the gasket is thereby chemically modified, substituting halogen atoms for the original hydrogen atoms and creating a fuel resistant barrier on the exposed surface of the gasket. Accordingly, a substantial cost savings can be realized through the use of standard, lower cost elastomers as the constituent or base material when treated according to this invention.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
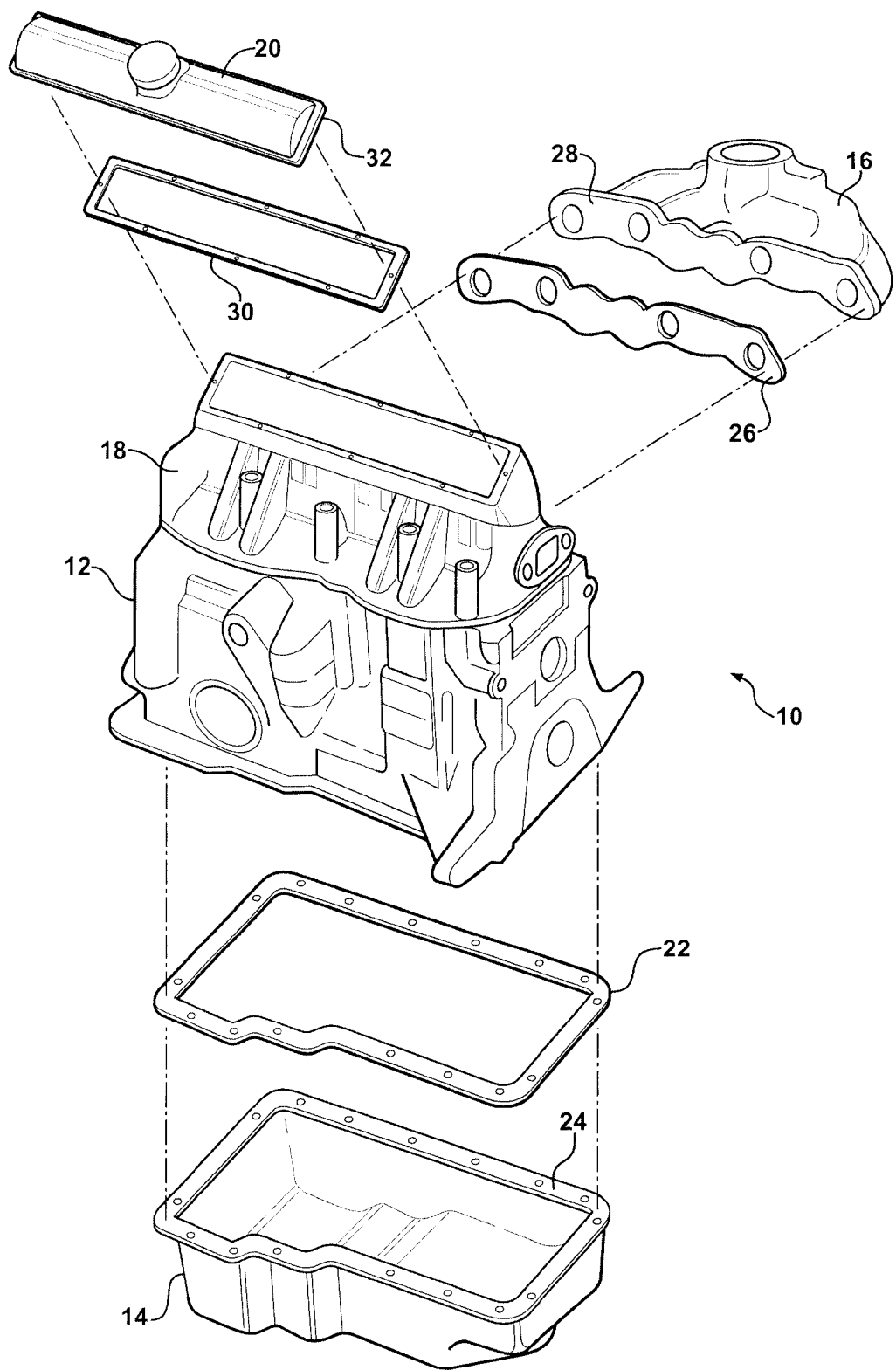
FIG. 1 is a simplified, exploded view of an internal combustion engine depicting an engine block with several components exploded therefrom, each with an associated gasket exposed to unburnt fuel.

Referring to the Figures, wherein like numerals indicate like or corresponding parts throughout the several views, an internal engine is generally shown at 10 in an exploded illustration. The engine 10 includes a block 12 to which a number of engine components are affixed, usually via threaded fasteners. For example, an oil pan 14 is affixed to the underside of the block 12, whereas an intake manifold 16 is indirectly affixed to the block 12 via a cylinder head 18. A valve cover 20 is also indirectly connected to the engine block 12 by way of the cylinder head 18.

Gaskets are provided for establishing fluid-tight interfaces between attached components. In the case of the oil pan 14, an oil pan gasket 22 is provided. Here, the oil pan 14 includes a periphery 24 which is adapted for direct connection to the bottom of the engine block 12. In service, the gasket 22 is compressed between the bottom of the engine block 12 and the periphery 24 of the oil pan 14, and thereby establishes a fluid-tight sealed interface between these two engine components. Similarly, an intake manifold gasket 26 is compressed between a periphery 28 of the intake manifold 16 and the mating surface on the cylinder head 18. And again, a valve cover gasket 30 is compressed between a periphery 32 of the valve cover 20 and the opposing surface of the cylinder head 18. Indeed, other engine components are likewise connected, either directly or indirectly to the engine block 12, with gaskets inserted therebetween and compressed to perfect tight sealing interfaces. The above-mentioned gaskets are merely representative of all the static gaskets in an engine which may be susceptible to fuel permeation.

Because many of these engine gaskets are exposed to volatile fuel, either during the aspiration process or as a contaminant in the engine oil, it is environmentally beneficial to enhance the fuel permeability resistance of many of the engine gaskets, including but not limited to the above-noted gaskets 22, 26 and 30. The subject invention includes the step of surface treating the relevant gaskets in a halogenated medium prior to being placed into service. During the halogenation process, halogen atoms in a halogenated gas or solution replace hydrogen atoms in the exterior surface of the gasket, thereby altering the chemical composition of the gasket's exterior surface. This halogenation treatment substantially enhances the fuel permeability resistance of the treated gasket.

Preferably, the gasket is fabricated from a low-cost elastomer material like acrylic of the type including hydrocarbon compounds. However, other low-cost elastomer compounds such as EPDM or HNBR can also be used instead of acrylic. Indeed, any suitable elastomer that contains the element hydrogen (H) may be used in the context of this invention. If the halogen in the halogenated medium is selected from the element fluorine, for example, three potential reaction mechanisms are expressed by the following equation:

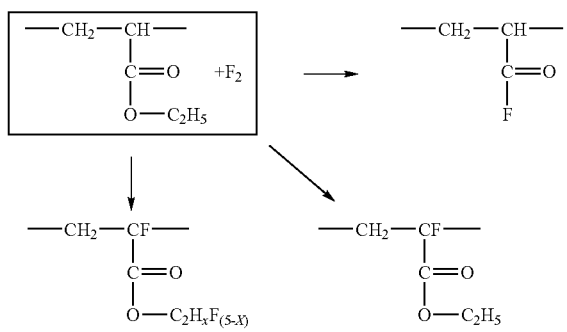

These reaction mechanisms depict at least three ways in which a halogen atom, fluorine (F) in this example, replaces a hydrogen atom in the material composition of the gasket surface layer. Similar reaction mechanisms for the halogens of bromine (Br) and chlorine (Cl) can be readily predicted by those of skill in the art.

Figure 2:
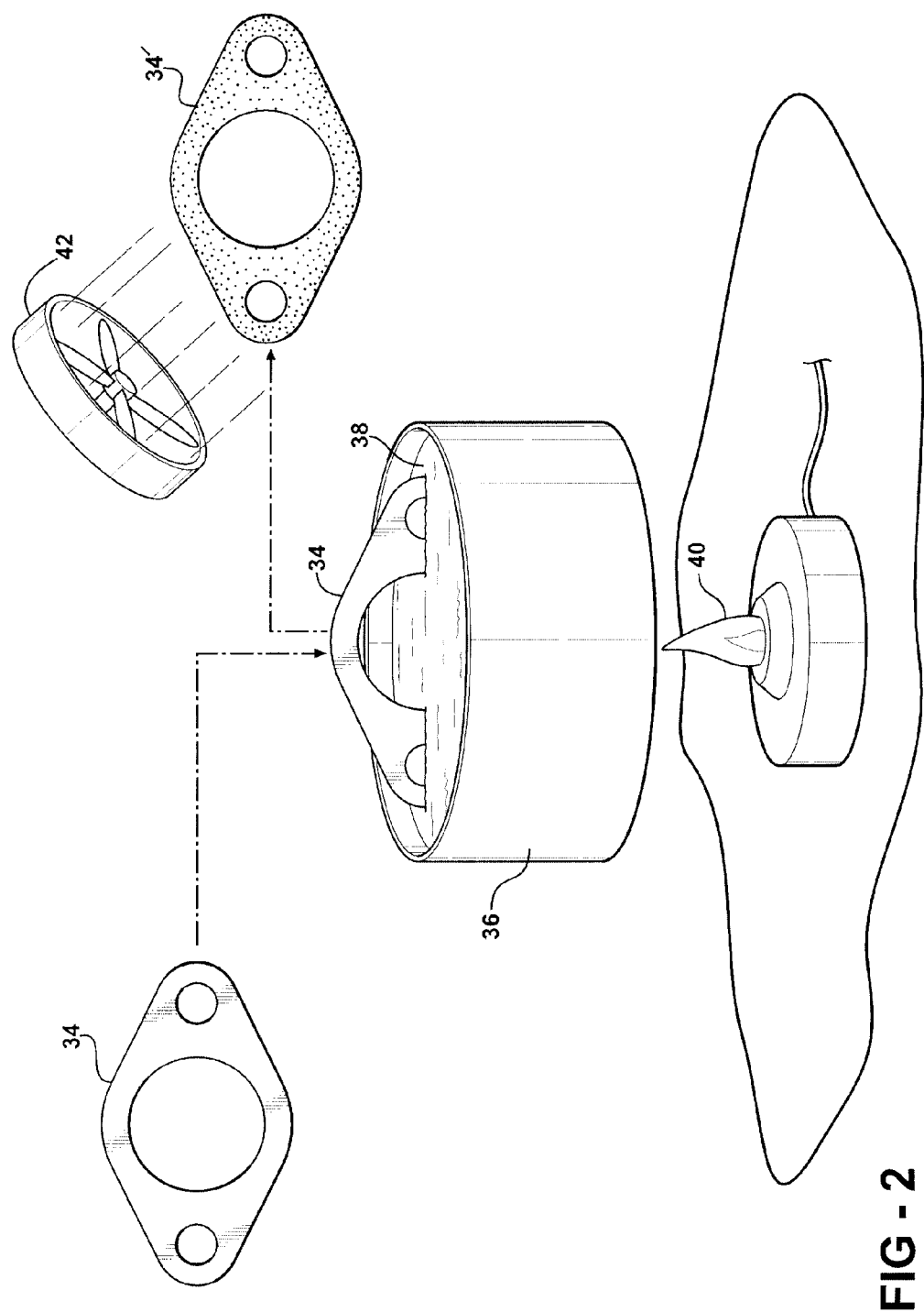
FIG. 2 is a schematic representation of the subject halogenation process, wherein a gasket is immersed in a liquid bath to create a halogenated surface treatment.

FIG. 2 illustrates a surface treating technique according to this invention wherein a representative gasket 30 is immersed in a tank 36 containing a liquid form of halogenated medium 38. The liquid solution 38 containing a halogen element may be excited by the application of heat, schematically represented by a burner 40. While the gasket 34 is immersed in the solution 38, halogen atoms in the medium are chemically substituted for the hydrogen atoms in the material composition of the gasket 34 according to at least one of the reaction mechanisms described above. The treated gasket 34' is then removed from the tank 36 and dried as suggested illustratively by fan 42. Of course, other drying techniques may be employed.

Figure 3:
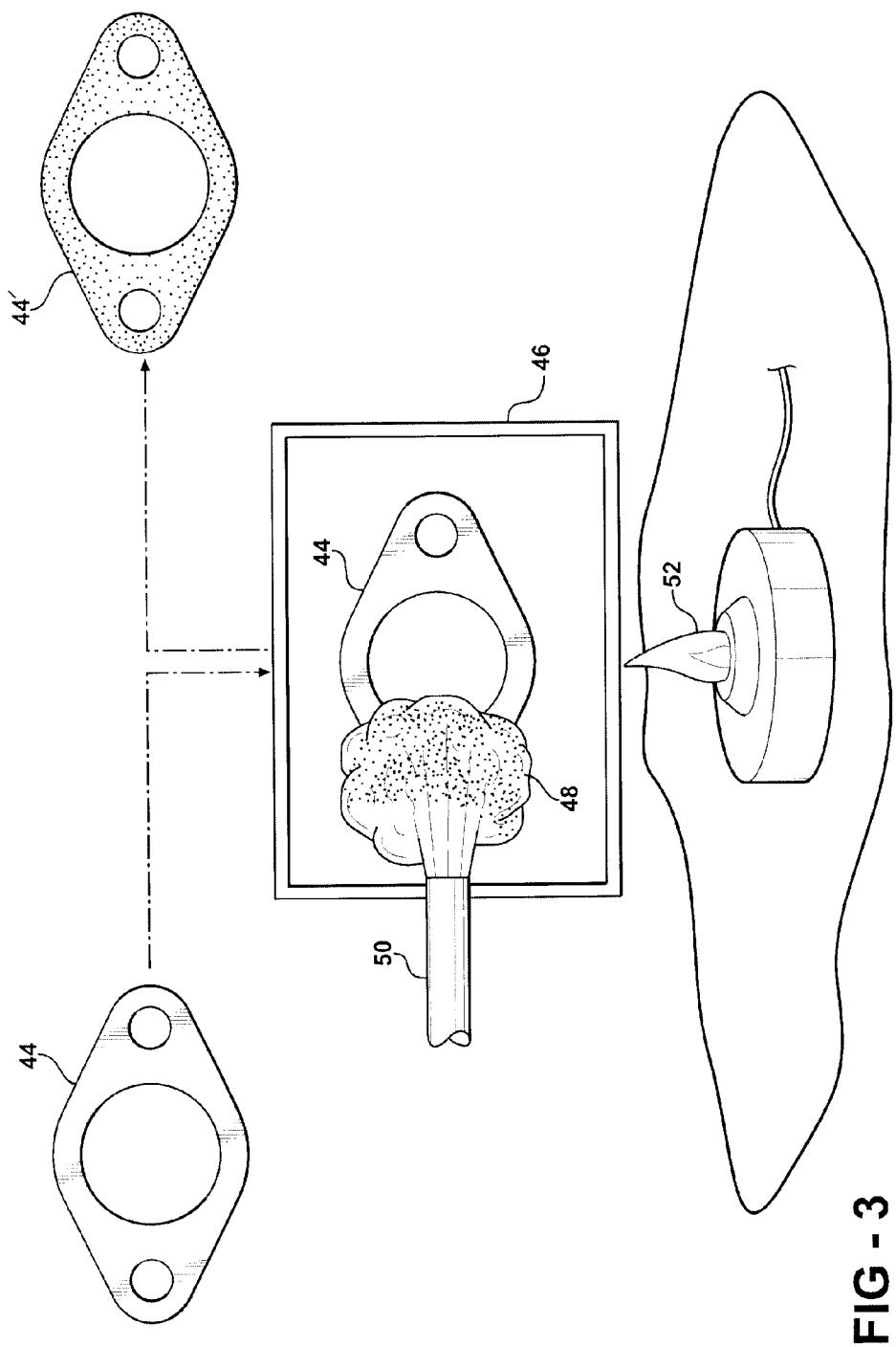
FIG. 3 is a schematic view as in FIG. 2, but representing an alternative technique of immersing the gasket in a halogenated gaseous bath.

The manufacturing method described above in connection with FIG. 2, wherein the halogenated medium is maintained in liquid form, is perhaps best used when the halogen in the halogenated medium is bromine (Br) or chlorine (Cl). When it is desired to use fluorine (F) as the halogen in the medium, it may be preferred to maintain the medium in gaseous form instead of liquid form. FIG. 3 illustrates an exemplary manufacturing process wherein a gasket 44 is placed into a chamber 46 into which a gaseous medium containing fluorine 48 is introduced through a supply pipe 50. Thus, the surface treatment is carried out in a fuming process wherein the fluorine atoms within the gaseous medium are chemically substituted for the hydrogen atoms present in the material composition of the elastomer gasket 44 according to one (or more) of the reaction mechanisms described above. Removed from the chamber 46, the surface-treated gasket 44' is possessed of an exterior surface which functions as a retarder to fuel permeation. As with the preceding example, the use of a heat source 52 to elevate the temperature of the gaseous halogenated medium 48 inside the chamber 46 is effective to provide an excited atmosphere more conducive to the halogenation process. Of course, other techniques and methods for carrying out the halogenation process according to the subject invention may be possible and applied in appropriate circumstances with equal or ever greater effectiveness than that described herein.

Figure 4:
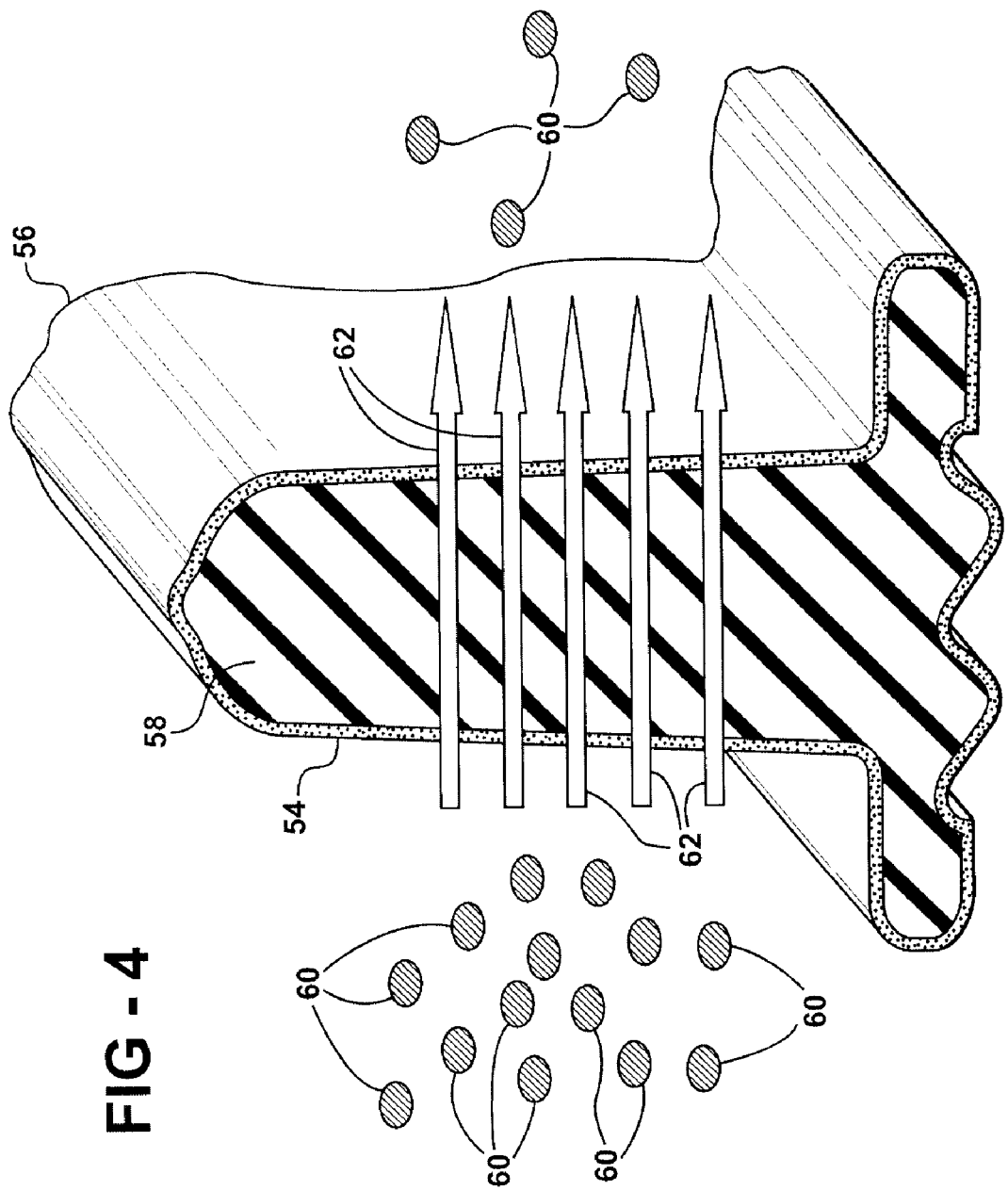
FIG. 4 is an enlarged, illustrative view depicting a gasket treated according to the subject process and placed into service whereby fuel vapor permeation is retarded from left to right.

FIG. 4 illustrates, conceptually, the subject invention when used in a gasket application where fuel vapors are present. Fuel molecules 60 (i.e., hydrocarbons) are represented in a gaseous or vapor state. Directional arrows 62 indicate the permeation direction, wherein the left side of gasket 56 would be an internal engine zone and the right hand side of gasket 56 would represent the environment. Prior art gaskets made from acrylic elastomers would not create any appreciable barrier to fuel vapor 60 permeation. As shown in FIG. 4 however, the subject gasket 56 does retard permeation, and in fact blocks a substantial quantity of fuel vapor molecules 60 from passing through to the environment. As shown in this highly illustrative cross section, the treated layer of the gasket 56 extends only to a defined depth below the surface 54. This is distinguished from prior art techniques where the entire material composition of the gasket would be manufactured from a fluorinated elastomer. Thus, according to the subject invention, the core 58 of the gasket 56 remains generally unaffected by the halogenation process.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A method for reducing fuel permeation through gasketed joints in an internal combustion engine, said method comprising the steps of:
   providing an engine block;
   providing an engine component at least indirectly connected about its periphery to the engine block;
   fabricating a gasket entirely from an elastomer containing the element hydrogen, the gasket being of the type having an exterior surface to be compressed between opposing surfaces for the purpose of establishing a fluid-tight interface therebetween;
   compressing the gasket with the periphery of the engine component to create a fluid-tight sealed interface;
   and said step of providing a gasket including surface treating the entire exterior surface of the gasket in a halogenated medium prior to said compressing step, whereby halogen atoms in the halogenated medium replace hydrogen atoms in the exterior surface of the gasket thereby altering the chemical composition of the entire exterior surface and substantially enhancing the fuel permeability resistance of the gasket.

2. The method of claim 1 wherein said step of surface treating the gasket includes immersing the gasket in a liquid bath.

3. The method of claim 2 wherein said step of immersing the gasket in a liquid bath includes providing a chlorine-containing liquid.

4. The method of claim 2 wherein said step of immersing the gasket in a liquid bath includes providing a bromine-containing liquid.

5. The method of claim 2 wherein said step of surface treating the gasket includes drying the gasket following said step of immersing the gasket in a liquid bath.

6. The method of claim 1 wherein said step of surface treating the gasket includes immersing the gasket in a gaseous bath.

7. The method of claim 6 wherein said step of immersing the gasket in a gaseous bath includes providing a fluorine-containing gas.

8. The method of claim 1 wherein said step of surface treating the gasket includes heating the halogenated medium.

\* \* \* \* \*